United States Patent [19]
Tobin

[11] Patent Number: 5,927,373
[45] Date of Patent: Jul. 27, 1999

[54] METHOD OF CONSTRUCTING FULLY DENSE METAL MOLDS AND PARTS

[75] Inventor: James R. Tobin, Cincinnati, Ohio

[73] Assignee: The Procter & Gamble Company, Cincinnati, Ohio

[21] Appl. No.: 08/799,747

[22] Filed: Feb. 12, 1997

Related U.S. Application Data

[60] Provisional application No. 60/029,051, Oct. 24, 1996.

[51] Int. Cl.$^6$ ........................................................ B22C 9/04
[52] U.S. Cl. .............................. 164/36; 164/45; 164/529
[58] Field of Search .................................. 164/36, 45, 6, 164/97, 529, 15

[56] References Cited

U.S. PATENT DOCUMENTS

| | | | |
|---|---|---|---|
| 3,605,855 | 9/1971 | Nakata | 164/23 |
| 3,751,271 | 8/1973 | Kimura et al. | 106/40 R |
| 3,823,002 | 7/1974 | Kirby, Jr. et al. | 29/182.1 |
| 3,829,295 | 8/1974 | Farmer et al. | 29/182.1 |
| 3,894,575 | 7/1975 | Baum | 164/97 |
| 3,929,476 | 12/1975 | Kirby, Jr. et al. | 75/214 |
| 4,146,080 | 3/1979 | Baum | 164/97 |
| 4,161,207 | 7/1979 | Fluckiger et al. | 164/80 |
| 4,327,156 | 4/1982 | Dillon et al. | 428/568 |
| 4,455,353 | 6/1984 | Bruce | 428/553 |
| 4,669,522 | 6/1987 | Griffin | 164/97 |
| 5,252,273 | 10/1993 | Sakai et al. | 264/86 |
| 5,333,667 | 8/1994 | Louat et al. | 164/97 |
| 5,507,336 | 4/1996 | Tobin | 164/34 |

FOREIGN PATENT DOCUMENTS

| | | | |
|---|---|---|---|
| 5120-448 | 3/1979 | Japan | B22C 9/06 |
| 55-117543 | 9/1980 | Japan | B22C 9/06 |
| 403189064 | 12/1989 | Japan | B22D 19/00 |
| 818827 | 8/1959 | United Kingdom . | |

OTHER PUBLICATIONS

"Recommended Foundry Procedure For Shell Investment Casting Using QuickCast Stereolithography Patterns"—QuickCast Foundry Reports—pp. 4–7—Dr. P. F. Jacobs—Apr., 1993.

Metal Parts From Selective Laser Sintering of Metal–Polymer Powders:—Sold Freeform Fabrication Symposium Proceedings—pp. 141–146—Badrinarayan & Barlow—1992.

"Rapid Manufacture of Prototype Injection Molds Using the Selective Laser Sintering Process"—Masters Thesis for University of Texas at Austin—James R. Tobin—May, 1994.

(List continued on next page.)

*Primary Examiner*—Harold Y. Pyon
*Assistant Examiner*—I.-H. Lin
*Attorney, Agent, or Firm*—William Scott Andes

[57] ABSTRACT

A method of constructing a fully dense metal part or a metal mold half for matin with another mold half to form a mold for casting multiple parts. Steps include placing a pattern having critical pattern surfaces in a flask having an open end. The critical pattern surfaces face upward. Other steps involve covering the critical pattern surfaces with a concentrated heat reversible gel solution added to the flask, and cooling the gel solution to form an elastic solid gel mold. Further steps include removing the flask and the pattern from the elastic gel mold, and casting a ceramic mold around the solid gel mold. In other steps the gel mold is liquified for removal from the ceramic mold and the ceramic mold is inverted so that its critical ceramic surfaces face upward. Still other steps involve covering the critical ceramic surfaces with a powder, and placing a quantity of an infiltration material over the powder, and placing the ceramic mold, the powder, and the infiltration material in a furnace at a temperature sufficient to melt the infiltration material without melting and sintering the powder. The quantity of the infiltration material is sufficient to fill voids between the particles, thereby generating a fully dense mold half.

19 Claims, 2 Drawing Sheets

OTHER PUBLICATIONS

"Precision Casting of Plastic Tooling by the Unicast Process"—SME Paper #CM70–118—R. J. Fitzgerald No date.

"Metal Parts Generation By Three Dimensional Printing"—Michaels, Sachs, Cima—Conference Proceedings, Fourth International Conference on Rapid Prototyping—1993.

"KELTOOL: Fast Tooling From Rapid Prototype Patterns"—Rapid Prototyping Report, vol. #1—Jun., 1991.

Tool And Manufacturing Engineers Handbook, vol. #2—Chapter 16, pp. 52–66—Society of Manufacturing Engineers—1984.

"Options Grow For Fast Mold Tooling"—Machine Design—Horner & Frantz—pp. 54–56—Sep. 12, 1996.

U.S. application No. 08/764,675, Tobin, filed Dec. 11, 1996.

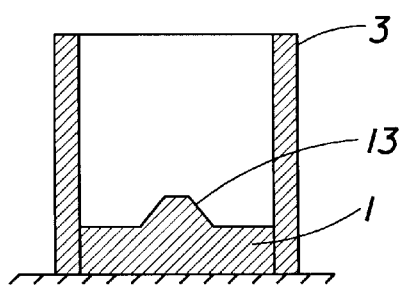
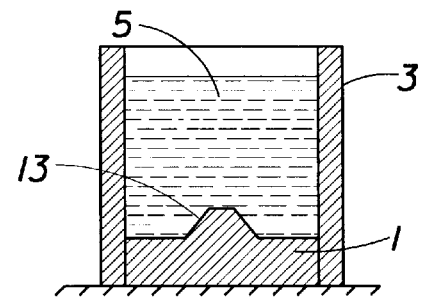
FIG.1      FIG.2
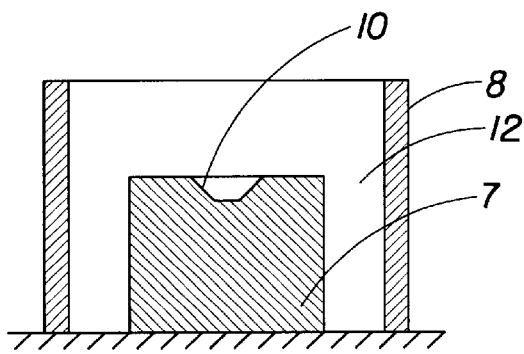
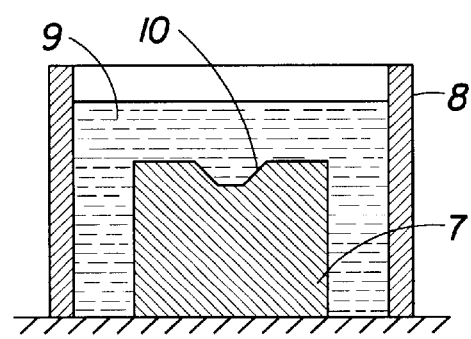
FIG.3      FIG.4
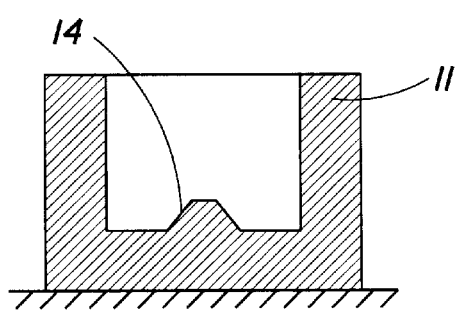
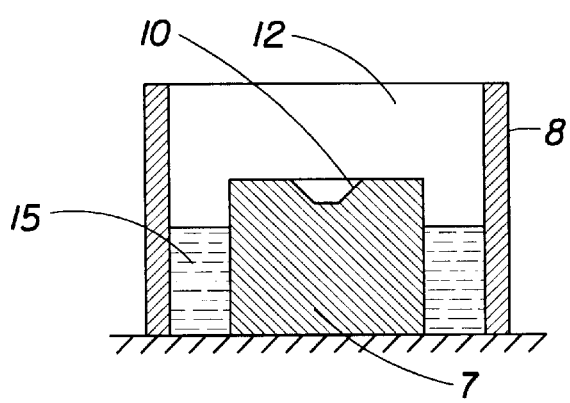
FIG.5      FIG.6

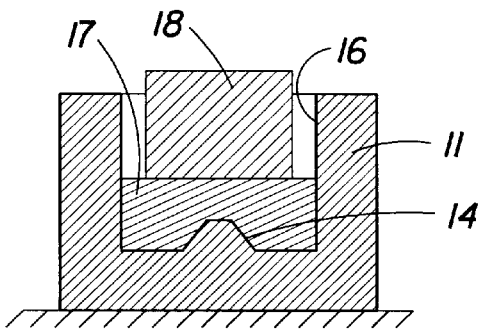
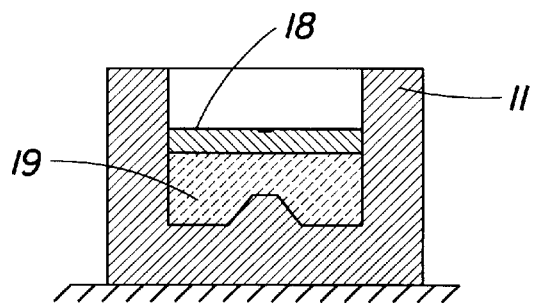
FIG.7  FIG.8
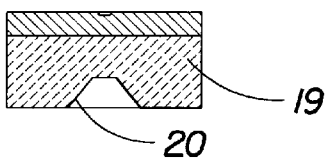
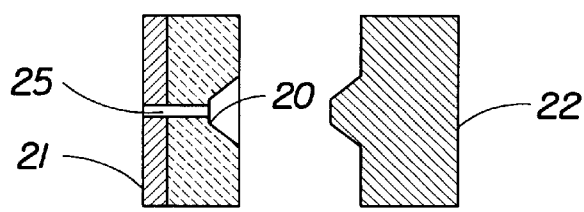
FIG.9  FIG.10
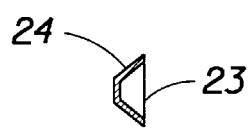
FIG.11

METHOD OF CONSTRUCTING FULLY DENSE METAL MOLDS AND PARTS

CROSS-REFERENCE RELATED APPLICATION

This is a new application having support in my prior provisional application, Ser. No. 60/029,051, entitled "Themally Reversible Material for Forming Ceramic Molds", filed on Oct. 24, 1996.

FIELD OF THE INVENTION

The present invention relates to methods for rapid prototyping, and more particularly to methods for constructing accurate metal parts and metal molds from which multiple prototype parts may be molded. This invention also relates to a method for preparing an accurate meal mold by using a heat reversible material to make an intermeiate mold of a pattern.

BACKGROUND OF THE INVENTION

Getting new products to the market faster than one's competition is recognized as a key to gaining a large market share. Thus, there is an incentive to speed up every step of new product development. One area of product development having a significant impact on overall market timing is the making of product and package prototype for market testing. Such testing usually requires multiple look-like, feel-like, and function-like prototypes for consumers to examine or use.

Where production quantities are needed, molding is the normal way of producing parts. Production molding typically involves plastic parts made in very expensive, multiple cavity, steel molds. For example, most bottles are blow-molded and most bottle closures are injection molded. It usually takes large production quantities to justify the cost of a production mold. For market testing, on the otherhand, only a few hundred parts may be needed. However, it is often necessary to mold prototype parts so that they have the same characteristics as production parts.

How to rapidly obtain molded prototype parts is therefore the challenge. Some solutions already exist for rapidly maling prototype part molds from which a small quantity of parts can be cast. For example, refractory powders and a thermoplastic binder can be combined under heat in a flexible rubber pattern. This process forms a green article, which is then heated further to melt out the binder. Infiltrating the resulting porous article with a molten, low melting point metal forms a mold of high density which is free of machined surfaces. The disadvantage of this process is that the powders are sintered in order to hold the mold together after the binder is removed. Sinteing causes particles to occupy less space than they would occupy unsintered. Thus, sintering shrinkage influences the accuracy of the mold and the parts made therefrom.

A siftered metal article having channels, such as for cooling fluid, may be formed by combining copper wires with sintering powders. Upon application of the sintering temperature, the wires melt and are absorbed into the pores of the sintered particles to form channels. Other processes in the art involve metal particles which are sintered together to form a matrix into which an infiltrating metal can be solidified. The sintering process causes particles to change their spacing somewhat, leading to inaccuracies in the metal infiltrated part dimensions.

Another method for rapidly prototyping parts is investment casting, using patterns generated by rapid prototyping systems instead of traditional injection molded wax patterns. An example of such a pattern is a QuickCast™ pattern, which is a trademark of 3D Systems, Inc. of Valencia, Calif. A hollow plastic pattern is coated with a thin ceramic shell, usually by a dipping process. The plastic is burned out of the ceramic shell leaving mininal amounts of ash residue behind. Molten metal is then poured into the ceramic shell to cast a metal part or a metal mold for a plastic part. Because the shell has only a small hole for admitting molten metal, it is difficult to inspect the critical surfaces for ash residue. Any ash reman on a critical Ice will potentially ruin the metal casting. The molten metal cools and shrinks such that critical surfaces are not reproduced accurately. The larger the parts, the greater the inaccuracy.

Improvements to the investment casting process utilize a ceramic shell which is created around a pattern by pouring a ceramic slurry and a binder that is chemically controlled to provide for precise setting of the ceramic shell. This is an improvement to the investment casting process because shell-making is faster. However, investment casting is still limited to small size molds where molten metal shrinkage does not exaggerate ares.

An improved method of constructing a fully dense mold is disclosed in U.S. Pat. No. 5,507,336 issued to Tobin, April, 1996. The method comprises placing a pattern within a tube which has a melting point greater than that of the infiltration material which will be used in making the metal mold. A ceramic member is cast between the pattern surf and the open end of the tube to transfer the critical pattern surfaces to the ceramic member. The ceramic surfaces are inverse to the pattern surfaces. The pattern is burned out and the ceramic surfaces remains in the tube. The ceramic is then covered with metal powder and an infiltration material from the other end of the tube, and the tube is placed in a furnace to form the metal part over the ceramic surfing. The metal pot has surfaces inverse to the ceramic surface. A met mold results when the ceramic piece is removed. The metal mold has the same shape as the pattern, and is useful for molding plastic parts having an inverse shape. This is an ideal proccss for parts having exterior critical surfces.

Tobin's process destroys the pattem from which the ceramic mold is created. A process for quickly forming a ceramic mold pattern which does not destroy the pattern, but which is accurate, is needed. Also, it is often necessary to provide a mating metal mold for plastic part molding. In order to do this, the metal mold may require a shape which is the inverse of the pattern. Thus, the ceramic mold needs to have the same shape as the pattern, and therefore requires an intermediate mold be produced between the ceramic mold and the pattern. As with Tobin's earlier process, any ceramic mold should not be contaminated on its surface so that the resulting meta mold is accurate.

In order to avoid destroying the pattern, it is desirable to use an intermediate mold made of a material which can be discarded or reused as needed to transfer the critical pattern surces to the ceramic mold. Wax and silicone rubbers have been used for these purposes. Wax (which is heat reversible) has the disadvantage of being brittle and when removed from the pattern can cause small pieces to break off especially where undercuts and thin features are involved. It also can expand and crack the ceramic when heated. Silicone rubbers need to be cured, and when the ceramic releases heat as it "sets", the silicone rubber can distort and cause inaccuries to develop in the ceramic pattern. Also, silicone rubber has to be removed from the pattern by air injection or other means which forces the silicone from the ceramic. This can cause the ceramic mold to break especially where undercuts and thin features are involved.

What has been missing is a method which avoids sintering for rapidly making accurate metal molds primarily for injection molding purposes, independent of part size, which enables a retatively large number of plastic parts to be molded therefrom.

It is therefore an object of this invention to provide a process for making a metal mold having an inverse shape to a pattern, which produces accurate reproductions of a pattern of any size, within a tolerance of ±0.005 inches.

It is also an object of this invention to provide a process which uses an elastic, heat reversible material to make an inverse intermediate mold of a pattern and which is not distorted during the forming of a ceramic mold therefrom, but which can be removed easily from the ceramic mold without destroying the delicate features of the ceramic mold.

These and other objects will be evident from the description herein.

SUMMARY OF THE INVENTION

In one aspect of the present invention, a method of constructing a fully dense mold half from a pattern comprises the step of placing a pattern having critical pattern surfaces in a flask having an open end. The critical pattern surfaces face upward toward the open end. Other steps involve covering the critical pattern surfaces with a concentrated heat reversible gel solution added to the flask, and cooling the gel solution to form an elastic solid gel mold. The gel mold has critical gel mold surf transferred from the critical pattern surfaces, which are inverse to the critical pattern surfaces. Further steps include removing the flask and the pattern from the eltic gel mold, and casting a ceramic mold around the solid gel mold, the ceramic mold having critical ceramic surfaces trnsferred from the critical gel mold surfaces which are inverse to the critical gel mold surfaces. The critical ceramic surfaces thereby accrately replicate the critical pattern surfaces. In other steps the gel mold is liquified for removal from the ceramic mold and the ceramic mold is inverted so that the critical ceramic surfaces face upward. Still other steps involve covering the critical ceamic surfaces with a powder, and placing a quantity of an infiltration material over the powder, and placing the ceramic mold, the powder, and the infiltration material in a furnace at a temperature sufficient to melt the infiltration material without melting and sintering the powder. The powder comprises particles having a melting temperature greater than that of an infiltration material. The particles have voids therebetween. The quantity of the infiltration material is sufficient to fill the voids between the particles, thereby generating a fully dense mold half. The fully dense mold half has critical fully dense mold surfaces transferred from the critical ceramic srfaces when the infiltration material solidifies. The critical fuily dense mold surfaces have a shape inverse to the critical ceramic surfaces. The final step includes removing the ceramic mold from the fully dense mold half to expose the critical fully dense mold surfaces for molding purposes.

The method may firther comprise the steps of machining the fully dense mold half so that a mating mold half may be aligned with the fully dense mold half in order to cast a part; and machining a sprue hole through the fully dense mold half in order to introduce castable material to the critical fully dense mold surfaces for casting the part. The process may further comprise the step of degassing the gel solution as it is cooled to form an elastic solid gel mold.

The heat reversible gel solution preferably comprises from about 35% to about 50% gel material; from about 45% to about 65% water, and from about 0% to about 10% defoaming agent. The gel material is preferably gelatin. The gel solution may further comprise fibers or other thickeners. The defoaming agent is preferably a silicone. The powder is tungsten. The infiltration material is selected from the group consisting of copper, copper alloy, and beryllium copper. The pattern is made of epoxy and is genated by a stereolithography process.

BRIEF DESCRIPTION OF THE DRAWINGS

While the specification concludes with claims which particularly point out and distinctly claim the present invention, it is believed that the present invention will be better understood from the following description of preferred embodints, taken in conjunction with the accompanying drawings, in which like reference numerals identify identical elements.

FIG. 1 is a sectioned front elevational view of a pattern 1, having critical pattern surfaces 13, positioned inside a first flask 3.

FIG. 2 is a sectioned front elevational view of pattern 1 inside the first flask 3 into which a concentrated gel solution 5 has been poured.

FIG. 3 is a sectioned front elevational view of a solidified gel mold 7, having critical gel mold surfaces 10 transferred from critical pattern surfaces 13, positioned inside a second flask 8 with an annular space 12 between second flask 8 and solidified gel mold 7.

FIG. 4 is a sectioned front devational view of second flask 8 having a plaster or cernic solution 9 poured over the solidified gel mold 7 and into annular space 12 and covering critical gel mold surfaces 10.

FIG. 5 is a sectioned front elevational view of a solidified plaster mold 11 from which has been removed second flask 3 and gel mold 7, exposing ceamic annular wall 16 and critical ceramic surfaces 14, which transferred from critical gel mold surfaces 10 and which accurately replicate critical pattern surfaces 13.

FIG. 6 is a sectioned front elevational view of an alternative embodiment to that shown in FIG. 4, wherein annular space 12 is partially filled with a non-exothermic plaster solution 15 in order to support gel mold 7 before an exothermic plaster solution (not shown) is added to second flask 8.

FIG. 7 is a sectioned front elevational view of the solidified plaster mold 11 of FIG. 5 which has tungsten carbide particles 17 placed inside annular wall 16 covering critical ceramic surfaces 14, and infiltration metal 18 placed on top of particles 17.

FIG. 8 is a sectioned front elevational view thereof, showing the result of placing the plaster mold 11 with particles 17 and infiltration metal 18 in a furnce and melting the infiltration metal into the particles, thereby producing a metal/particle composite mold 19, which has critical ceramic surfaces 14 transferred thereto.

FIG. 9 is a sectioned front elevational view thereof, showing removal of plaster mold 11 after metal/particle composite 19 has solidified, exposing critical metal mold 20 formed in metel/particle composite 19.

FIG. 10 is a sectioned front elevational view thereof showing metal/particle composite 19 rotated 90° and having both ends machined to form a first fully dense metal mold half 21, and showing a second similarly constructed mold half 22 about to mate with first mold half 21 so that a part may be molded.

FIG. 11 is a sectioned front elevation of a part 23 injection molded between the mating metal halves 21 and 22, part 23 having an outer surface 24 which accurately replicates critical pattern surface 13 of pattern 1.

DETAILED DESCRIPTION OF THE INVENTION

As used herein, the term "ceramic" refers to a material such as plaster, clay, silica or other nonmetallic material which can be fired to create a hardened product.

As used herein, the term "gel" refers to a material which generally forms a colloidal gel or solid material which is elastic or rubbery, yet solid and not brittle. Gelatin is a preferred material for making a gel. It forms a tender elastic solid which does not expand or shrink with temperature changes within the range that the gel experiences while in contact with a ceramic pouring which sets into a solid shape; yet the gel melts or liquifies when the ceramic shape is heated or undergoes a further exothermic reaction.

As used herein, the term "heat reversible" refers to a material which solidifies at a temperature below about 50° C. and which melts or liquifies at temperatures above about 65° C.

Referring now to the drawings, and more particularly to FIG. 1, there is shown a preferred pattern of the present invention, which provides a method of constructing fully dense metal molds, and is generally indicated as 1. Pattern 1 is preferably made by a stereolithography process, well known in the prototyping art, in which an electronic file describing the pattern is rapidly fabricated by laser curing of a polymer. Even more preferably, pattern 1 is made of epoxy and is produced with a hollow honeycomb structure by a QUICKCAST™ process, a trademark of 3D Systems, Inc. of Valencia, Calif. Pattern 1 has critical pattern surfaces 13, which for exemplary purposes represent the exterior of a truncated conical bottle closure.

FIG. 1 shows epoxy pattern 1 resting with critical pattern surfaces facing upward and a flask 3 placed around the pattern. Flask 3 is preferably open at both ends and it has a continuous wall which extends above the pattern to contain a material placed on top of the pattern, as shown in FIG. 2. Pattern 1 fits tightly against the continuous wall.

An elastic material is poured over the patten. The elastic material may be an RTV silicone rubber. Making such rubber patterns is common in the art. The step of removing a rubber mold from the pattern may comprise pulling the rubber patern directly from the pattern or air ejecting it therefrom, since it is flexible and does not adhere to the patten. Alternatively, the elastic material may be a solid gel made from a heat reversible material, such as a hydrocolloidal gelatin solution. Gelatin easily disperses or dissolves in hot water and forms a tender elastic material when cooled.

The elastic mold is intended to be an intermediate mold which transfers the critical pattern surfaces to a ceramic mold. A ceramic solution is similarly poured over the elastic mold in an open flask and allowed to harden. However, the ceramic material typically generates heat in an exothermic binding action. Such heat may cause an RTV silicone rubber to expand and distort the geometry of the critical surfcs. Also, a silicone rubber mold must eventually be removed from the ceramic mold by pulling or air ejecting it from the ceramic mold. Where there are thin sections or undercuts involved, such removal steps may damage the brittle ceramic mold.

Gelatin is easily removed from a ceramic mold by melting it. The exothermic reaction of the ceramic typically melts the gelatin adjacent to it so that surface distortions do not occur as the ceramic hardens. The resulting ceramic mold can be washed with hot water, glycerin, or acetic acid to remove any residue before firing the ceramic mold to harden it.

Gelatin is a protein which is usually derived from meat and some dairy products. It forms a structure or matrix of intertwined and partially associate protein molecules in which the water is entrapped. The preferred gelatin is 250 Bloom edible porkskin gelatin available from Kind & Knox Gelatin, Sioux City, Iowa.

Other gelling systems which meet these criteria can be used. Lambda carrageenan and mixtures of xanthan gum and locust bean gum can be used. Fibers or other structural materials can be dispersed in the gel. These will add strength and can be easily removed with the ncted gel from the ceramic mold.

The more concentrated the gel solution, the better. Generally, a gelatin solution is formed which contains from about 35% to about 55% gelatin solids, from about 45% to about 65% water, and from about 0% to about 10% of a surfactant or defoaming agent. More preferably, a gelatin solution contains from about 35% to about 45% solid gelatin, from about 50% to about 65% water, and from about 3% to about 8% defori agent. An exemplary mixture is 475 cc of water, 25 cc of defoaming agent, and 175 grams of gelatin. Similar proportions are used for other gel systems and the exact level is well within the skill of a person in this art. Other additives which can bind water or lower the water activity of the gel can be added. For example, glycerin, sugar or glycols can be added.

Typically, the gelatin is added to cold water. Then the mixture is heated. The water and gelatin or gel material is waed to a range from about 80° C. to about 100° C. Alternatively, the gelatin or other ge mateial can be added to hot water. The solution is stirred until the gel is dissolved or dispersed so that the mixture appears to be homogeneous. Preferably, the solution is heated in a microwave oven to maintain the tempraure of the water and enhance the dispersion. The solution can be placed under a vacuum during the dispersion to prevent foaming. Other degassing processes can also be used.

The surfactant or defoaming agent is preferably added to the water before combining the water with the gelatin. Silicones and nonionic surfactants are good defoaming agents. Dimethyl silicone can be used. A preferred defoaming agent is: polydimethylsiloxine available as Foam Drop-S from Spectrum Services of Cincinnati, Ohio.

The gel dispersion is poured over the pattern in an open ended flask, as in FIG. 2. Of some concern is moisture absorption by the pattern when the hot gelatin solution is poured onto it. Resins used in stereolithography are often moisture sensitive. It may therefore be beneficial to seal the surface of the pattern first by spraying on a thin coating of KRYLON™ paint, a product of Sherwin Williams Co., of Solon, Ohio.

Degassing is also beneficial at the gelatin pouring stage. Pouring may be done in a vacuum chamber at 30 inches of mercury vacuum, for example. The entrained air is removed to prevent air bubbles from collecting at the pattern/gel interface. Air or gas entrained within the gel may also cause the gel matrix to be unstable. The gelatin casting may be done in multiple pours, depending on the size of the part, so that degassing is more effective in removing air bubbles. The first pour of a multiple pour is preferably allowed to form a skin before the next pour so that air bubbles will not penetrate the first pour.

The flask is refrigerated until the gel has formed an elastic solid structure. Depending on the concentration of the gel, the size of the pattern, and the depth of the gel layer, from about 1 to about 15 hours are required to set the gel. Generally, from about two to eight hours in a refrigerator at 40° F. or 4° C. is sufficient. Very concentrated solutions will form an elastic solid structure within a few hours at room temperatures.

The depth of the gel solution will depend upon the pattern and the size that is desired for the cemic mold. One skilled in the art can easily detenine this without undue experimentation. Typically, a minimum gel thickness of about one inch is desired above each critical pattern surface.

The solidified intermediate gel mold is then pulled from the pattern. In a preferred embodiment the flask is built with easily removable sides which are then pulled off the gel mold and the gel mold is then pulled off the pattern. The gel mold is structurally elastic enough to easily release the pattern piece and retain inverse replications of the critical surfaces of the pattern without distortion, even when undercuts and thin features are involved.

It is preferred that the gel mold be stored at refrigerator temperatures, but not frozen. The protein holds the water within its matrix and prolonged exposure to warm temperes above about 18° C. can cause the water to be released. This can affect the accuracy of gel mold critical sfaces.

FIG. 3 discloses the gel mold placed in a second flask to which a plaster or ceramic solution will be added. The gel mold is placed with the critical gel mold surfaces facing upward toward the open end of the second flask. Preferably, sufficient space is allowed between the second flask and the gel mold so that ceramic will be formed around the gel mold in that space. The ceramic mold made therefrom will have a continuous annular ceramic rim surrounding the critical ceramic surfaces so that the ceramic mold may be readily used for casting a metal infiltration mold without the need for another flask.

Plaster or other ceramic material is poured into the second flask to a depth above the gel mold. Preferably, the depth is from about 1 cm to about 5 cm above the gel mold. The poured ceramic material is preferably degassed under vacuum to remove any air which could affect the final ceramic mold formation. The plaster or ceramic material first "sets" or takes a solid shape and then completely solidifies. During the binding process, an exothermic reaction takes place in the plaster which melts the surrounding gel. The flask is preferably coated with a release agent so that the flask may be easily removed from the ceramic mold.

In a preferred embodiment, two different ceramic materials are used. The gel mold is first partially enased in a first plaster or clay material which sets up to become a rigid structure but which is not exothermic or which does not subject the gel structure to temperatures that are near its melting or liquifaction point. This non-exothermic material is typically weak. It is poured to fill or partially fill the annular space in order to anchor the gel mold, which could otherwise float upward during the casting of an entire plaster structure due to the plaster's greater density as compared to that of the gelatin. Because of the weakness of the non-exothermic ceramic, the annular wall is typically made at least one inch thick for handling purposes. The first plater sets up in about 45–90 minutes.

After the first ceramic mold has solidified, a second plaster or clay is applied to cover the first ceranic mold and the citical gel mold surfaces. The second ceramic material does undergo an exothermic racton to increase its strength, and it bonds readily to the first ceramic mold. The exothermic plaster typically takes about 10 minutes to set up. Icing down the binder for the second plaster may help to slow down the reaction and provide more time for degasng the plaster. The two stage plaster casting results in a more accurate ceramic mold, whose critical ceramic surfaces accurately replicate the critical pattern surfaces of the original pattern. FIG. 6 discloses the use of a first plaster 15.

The preferred non-exothermic, phosphate-bonded plaster is an 847 core mix available from Ranson & Randolph of Maumee, Ohio. C1-Core Mix, also available from Ranson & Randolph of Maumee, Ohio, is the most preferred exothermic ceramic material. It is a mixture of fused silica, zirconium silicate, ammonium phosphate, silica (cristobalitc) and magnesium oxide. Core hardner 2000, also available from Ranson & Randolph, can be used. It contains amorphous silica and dipotassium-6-hydroxy-3-oxo-9-xanthene-0-benzoate.

Preferably, the gel mold is at its refrigerated temperature when a ceramic solution is poured over it in the second flask. After the ceramic is set, the ceramic mold and remaining gelatin can be heated in an oven to completely melt the gel for easy removal. The temperature of the oven should be about 100° C. to about 275° C. to insure the melting of the gel but not so hot as to decompose the protein. Gelatin with water entrapped within the matrix melts or liquifies slowly and the center portion is well enough insulated that heat above 100° C. does not cause problems with the water boiling.

The open end of the ceramic mold, which corresponds to the bottom end of the second flask, allows easy access to pour the melted or liquid gel dispersion from the ceramic mold. Also, critical ceramic surfaces may be easily inspected from the open end to see that all gelatin and any residue is removed.

Placing the ceramic mold in a fiunace and heating it to approximately 1100° F. (990° C.) for at least 3 hours fully sets the plaster for further processing. A hydrogen atmosphere can be used as there is no residue remaining on the ceramic which needs to be burned off. This lack of residue is an important distinction when compared to ceramic mold making processes using epoxies and waxes.

A metal mold may be made from the ceramic mold in accordance with the teachings of commonly assigned U.S. Pat. No. 5,507,336 issued to Tobin on Apr. 16, 1996, which is hereby incorporated herein by reference. However, the meal mold may be nude without the need for external tube because the ceramic mold of the present invention has a continuous annular rim surrounding the critical ceramic surfaces.

FIG. 7 shows the addition of a fin powder, such as tungsten, onto critical ceramic surfaces 14 of plaster mold 11. The plaster mold has an annular wall extending above the critical surfaces. The annular wall enables critical ceramic surfces to be compl covered with powder. The powder is preferably screened to a minus 350 mesh, having particle sizes less than 45 microns.

On top of the powder is placed a powder, chips, or a slug of an infiltration metal of sufficient quantity to more than fill the voids between the powder particles. Infiltration metal may be copper or its alloys but is preferably a bronze powder (80% copper/20% tin). XF2 copper from U.S. Bronze Powders, Inc., of Franklin Park, Ill. is useful herein. Ceramic member is then placed in a hydrogen furnace. The furnace is ramped up to about 1775° F. (985° C.) and held there for approximately 90 minutes. In the reducing atmosphere of the furnace, this temperature causes bronze to melt and flow into unmelted powder to form metal composite. The powder also acts as a filter and prevents impurities from the molten infiltration metal reaching the critical ceramic surfaces. This eliminates the need for a porous ceramic filter, such as those used for investment castings.

The ceramic member acts as a heat insulator to the powder prior to it being infiltrated. The powder does not reach the furnace temperature as rapidly as does the infiltrant resting above powder. However, as the molten infiltrant is superheated above its melt temperature, it heats the cooler powder as it infiltrates. Tungsten powder typically remains below its sintering temperature, thereby eliminating powder sintering at the critical ceramic surfaces.

As the bronze cools, it shrinks. However, unmelted particles, which have been packed together, provide a high percentage of the volume of material adjacent to the critical ceramic surfaces. Because the particles preferably do not melt or sinter, they do not shrink. The copper fills between the particles by gravity and capillary attraction to create metal composite. Upon solidification, the composite accurately assumes critical mold surfaces, which have the inverse shape of critical ceramic surfaces, and therefore replicate the critical pattern surfaces of the pattern. A shrinkage dimple typically forms atop excess solidified infiltration metal.

Particle size, particle size distribution, and particle shape of powder can affect the process in several ways. Finer particles usually result in a smoother surface finish. Particle size distribution affects the tap density of the powder, which in turn affects the powder-to-infiltration-metal ratio in the final mold. The tap density of tungsten powder (7–9 microns) typically averages between 20% and 30%. By tailoring the particle size distribution, tap densities can be significantly increased.

FIG. 9 shows the removal of the plaer mold to expose the critical metal mold surfaces. The ends of the metal/particle composite are thereafter machined so that the composite forms a first mold half which can mate with a second mold half, as shown in FIG. 10. The first mold half may also have a sprue hole 25 machined into it.

FIG. 10 shows a second mold half being mated with the first mold half to form a mold cavity between them. The second mold half may be made by a similar rapid prototyping method. Mold halves preferably are combined to be an injection mold. When molten plastic resin is injected through sprue hole 25 into the cavity, a plastic closure 24 is molded. Plastic closure 24 is shown in FIG. 11, removed from the mold.

The important features of this process are its use of simple, rapid turn-around steps, and its accurate transfer of critical surfaces from the pattern to the molded part. Also, this mold-maling process is not limited to small parts, as is investment casting, where inaccuracy due to shrinkage increases with part size. The fully dense metal mold srructure of the present invention is both highly heat conductive and very wear resistant because of the materials chosen.

Steel cooling water tubes and/or ejector sleeves, not shown, may be added into the particles before the infiltration metal is melted. The molten bronze then solidifies around the unmelted steel inserts to fix them in place.

In a particularly preferred endint of the present invention, pattern 1 is made of epoxy resin #SL5170, from 3D Systems, Inc., and is generated from an electronic file by a stereolithography process, usig a model SLA-250 machine, made by 3D Systems, Inc. of Valencia, Calif.

The preferred embodiment of the present invention utilizes a metal powder and a metal infiltrant for making a fully dense metal mold; however, there are many possible combinations of materials that can be used to make a mold by particle infiltration. Metal powder (tungsten) and metal infiltrant (copper alloy-bronze) are chosen because the resulting composite material has appropriate mechanical properties, good thIimw conductivity, and machinability properties for the production of metal inserts for plastic injection molds.

The primary criteria for powder and infiltrant selection for successful and accurate production of pattern shapes is threefold: 1) both the base powder (which may include fibers, large particles, fine powders, and a combination thereof) and the infiltrant material should be chemically stable with each other and with the ceramic mold in the temperature range used to infiltrate the base powder; 2) the infiltrant material should be capable of penetrating the base powder at a temperature less than half the melting point of the base powder to prevent sinteing, shrinkage, or distortion of the base powder particles; and 3) the surface wetting charachteristics of the base powder and infiltrant combintog should promote capillary attraction for rapid and total infilration. In some cases a reducing atmosphere and/or pressure may be used to aid the infiltration process.

Examples of alternative material combinations for base powder and infiltrant, which could be used in the present invention, include: metal powder infiltrated with a thermosetting epoxy resin, ceramic powder infiltrated with aluminum, and ceramic powder infiltrated with a thermosetting epoxy resin.

While particular embodiments of the present invention have been illustrated and described, it will be obvious to those skilled in the art that various changes and modifications may be made without departing from the spirit and scope of the invention, mnd it is intended to cover in the appended claims all such modifications that are within the scope of the invention. For example, the description of the present invention has been directed primarily toward the fabrication of metal molds. Other potential applications envisioned include the fabrication of electrodes for electric discharge machining (EDM). A copper alloy/tungsten alloy composite metal electrode would provide excellent electrical conductivity and wear resistance properties essential for EDM processes.

What is claimed is:

1. A method of constructing a fully dense mold half from a pattern comprising the steps of:
   a) placing a pattern having critical pattern surfaces in a flask having an open end, said critical pattern surfaces facing upward toward said open end;
   b) covering sad critical pattern surfaces with a concentrated heat reversible gel solution added to said flask;
   c) cooling said gel solution to form an elastic solid gel mold, said gel mold having critical gel mold surfaces transferred from said critical pattern surfaces which are inverse to said critical pattern surfaces;
   d) removing said flask and said pattern from said elastic gel mold;
   e) casting a ceramic mold around said solid gel mold, said ceramic mold having critical ceramic surfaces transferred from said critical gel mold surfaces which are inverse to said critical gel mold surfaces, said critical ceramic surfaces thereby accurately replicating said critical pattern surfaces;
   f) liquifying said gel mold for removal from said ceramic mold;
   g) inverting said ceramic mold so that said critical ceramic surfaces face upward;

h) covering said critical ceramic surfaces with a powder, said powder comprising particles having a melting temperature greater than that of an infiltration material, said particles having voids therebetween;

i) placing a quantity of an infiltration material over said powder, and placing said ceramic mold, said powder, and said infiltration material in a furnace at a temperature sufficient to melt said infiltration material without melting and sintering said powder, said quantity of said infiltration material being sufficient to fill said voids between said particles, thereby generating a fully dense mold half, said fully dense mold half having critical fully dense mold surfaces transferred from said critical ceramic surfaces when said infiltration material solidifies, said critical fully dense mold surfaces having a shape inverse to said critical ceramic surfaces; and j) removing said ceramic mold from said fully dense mold half to expose said critical fully dense mold surfaces for molding purposes.

2. The method according to claim 1 wherein said heat reversible gel solution comprises gel material; water, and a defoaming agent.

3. The method according to claim 2 wherein said gel material is gelatin.

4. The method according to claim 2 wherein said defoaming agent is a silicone.

5. The method according to claim 1 further comprising the step of degassing said gel solution as it is cooled to form an elastic solid gel mold.

6. The method according to claim 1 wherein said gel solution further comprises fibers or other thickeners.

7. The method of claim 1 wherein said powder is tungsten.

8. The method of claim 1 wherein said infiltration material is selected from the group consisting of copper, copper alloy, and beryllium copper.

9. The method of claim 1 wherein said pattern is made of epoxy and is generated by a stereolithography process.

10. The method of claim 1 further comprising the steps of:

k) machining said fully dense mold half so that a mating mold half may be aligned with said fully dense mold half in order to cast a part; and l) machining a sprue hole through said fully dense mold half in order to introduce castable material to said critical fully dense mold surfaces for casting said part.

11. A method of constructing a fully dense mold half from a pattern comprising the steps of:

a) placing a pattern having critical pattern surfaces in a first flask having an open end, said critical pattern surfaces facing upward toward said open end;

b) covering said critical pattern surfaces with a gelatin solution added to said first flask and;

c) cooling said gelatin solution while degassing said gelatin solution to form an elastic solid gelatin mold, said gelatin mold having critical gelatin mold surfaces transferred from said critical pattern surfaces which are inverse to said critical pattern surfaces;

d) removing said pattern and said first flask from said gelatin mold and placing said gelatin mold in a second flask with said critical gelatin mold surfaces facing upward toward an open end of said second flask, said second flask dimensioned to provide an annular space around said gelatin mold;

e) filling said annular space with a first ceramic solution added to said second flask while degassing said first ceramic solution, said first ceramic solution solidifying without generating heat to form a first ceamic mold in order to anchor said geltin mold in place and to form a continuous annular wall surrounding said critical gelatin mold surfaces;

f) covering said first ceramic mold and said gelatin mold with a second ceramic solution added to said second flask, said second ceramic solution exothermically binding to form a second ceramic mold bonded to said first ceramic mold, said second ceramic mold having critical ceramic surfaces transferred from said critical gelatin mold surfaces which are inverse to said critical gelatin mold surfaces, said critical ceramic surfaces thereby accurately replicating said critical pattern surfaces; and g) liquifying said gelatin mold via heating to remove said gelatin from said first and second ceramic molds and removing said second flask from said first and second ceramic molds.

h) inverting said first and second ceramic molds so that said critical ceramic surfaces face upward;

i) covering said critical ceramic surfaces within said annular wall with a powder, said powder comprising particles having a melting temperature and a sintering temperature greater than a melting temperature of an infiltration metal and having voids therebetween;

j) placing an infiltration metal over said powder, said infiltration metal being sufficient in quantity to fill said voids between said particles;

k) placing said first and second ceramic molds in a hydrogen furnace at about 2100° F., thereby melting said infiltration metal into said voids between said particles of said powder without melting and sintering said particles, in order to generate a fully dense metal mold half, said fully dense metal mold half having critical metal mold wrfaces transferred from said critical ceramic surfaces when said infiltration metal solidifies;

l) removing said ceramic member from said fully dense metal mold half, to expose said critical metal mold surfces for molding purposes.

12. The method according to claim 11 wherein said gelatin solution comprises gelatin; water, and a defoaming agent.

13. The method according to claim 12 wherein said defoaming agent is a silicone.

14. The method according to claim 11 further comprising the step of degassing said gel solution as it is cooled to form an elastic solid gel mold.

15. The method according to claim 11 wherein said gelatin further comprises fibers or other thickeners.

16. The method of claim 11 wherein said powder is selected from the group consisting of tungsten and tungsten carbide.

17. The method of claim 11 wherein said infiltration metal is selected from the group consisting of copper, copper alloy, and beryllium copper.

18. The method of claim 11 wherein said pattern is made of epoxy and is generated by a stereolithography process.

19. The method of claim 11 further comprising the steps of:

m) machining said fully dense metal mold half so that a mating mold half may be aligned with said fully dense metal mold half in order to cast a part; and n) machining a sprue hole through said fully dense metal mold half in order to introduce castable material to said critical metal mold surfaces for casting said part.

* * * * *